US011031642B2

(12) United States Patent
Meyer et al.

(10) Patent No.: US 11,031,642 B2
(45) Date of Patent: Jun. 8, 2021

(54) ELECTRICAL ENERGY STORAGE DEVICE WITH EFFICIENT HEAT DISSIPATION

(71) Applicant: Rolls-Royce Deutschland Ltd & Co KG, Blankenfelde-Mahlow (DE)

(72) Inventors: Andreas Meyer, Nuremberg (DE); Fabian Quast, Erlangen (DE); Wolfgang Weydanz, Buckenhof (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 385 days.

(21) Appl. No.: 15/548,293

(22) PCT Filed: Jan. 19, 2016

(86) PCT No.: PCT/EP2016/050954
§ 371 (c)(1),
(2) Date: Aug. 2, 2017

(87) PCT Pub. No.: WO2016/124386
PCT Pub. Date: Aug. 11, 2016

(65) Prior Publication Data
US 2018/0013182 A1   Jan. 11, 2018

(30) Foreign Application Priority Data

Feb. 6, 2015 (DE) .......................... 102015202149.1

(51) Int. Cl.
*H01M 10/61* (2014.01)
*H01M 10/64* (2014.01)
(Continued)

(52) U.S. Cl.
CPC .......... *H01M 10/613* (2015.04); *B60L 50/64* (2019.02); *B60L 50/66* (2019.02); *B60L 58/26* (2019.02);
(Continued)

(58) Field of Classification Search
CPC ............ H01M 10/613; H01M 10/647; H01M 10/6555; H01M 10/6557; H01M 10/6567
See application file for complete search history.

(56) References Cited

U.S. PATENT DOCUMENTS 6,106,972 A    8/2000 Kokubo et al.
6,482,542 B1 * 11/2002 Takaki ................ H01M 10/647
                                                             429/120
(Continued)

FOREIGN PATENT DOCUMENTS

CN    101501879 A    8/2009
DE    19829293 A1    1/1999
(Continued)

OTHER PUBLICATIONS

English Translation of DE 102009028920.*
(Continued)

*Primary Examiner* — Ula C Ruddock
*Assistant Examiner* — Frank A Chernow
(74) *Attorney, Agent, or Firm* — Lempia Summerfield Katz LLC

(57) ABSTRACT

An electrical energy storage device includes prismatic energy storage cells arranged adjacent to one another such that interfaces of adjacent storage cells run at a distance from one another such that the interfaces of the adjacent storage cells form an intermediate space. A respective first layer is arranged between the interfaces of adjacent storage cells, the first layer abutting one of the two interfaces of the adjacent storage cells under pressure. Either the respective first layer also abuts the second of the two interfaces of the adjacent storage cells under pressure, or a second layer is arranged between the interfaces of adjacent storage cells, the second layer abutting the second of the two interfaces of the adjacent storage cells under pressure. A heat-conducting device is arranged in or between the first layer and the (Continued)

second layer is conducted out of the intermediate space between the adjacent storage cells.

18 Claims, 5 Drawing Sheets

(51) Int. Cl.
| | |
|---|---|
| *H01M 10/65* | (2014.01) |
| *H01M 10/613* | (2014.01) |
| *H01M 10/625* | (2014.01) |
| *H01M 10/653* | (2014.01) |
| *H01M 10/647* | (2014.01) |
| *H01M 10/6557* | (2014.01) |
| *H01M 10/6567* | (2014.01) |
| *H01M 10/6555* | (2014.01) |
| *H01M 10/658* | (2014.01) |
| *B60L 58/26* | (2019.01) |
| *B60L 50/60* | (2019.01) |
| *B60L 50/64* | (2019.01) |
| *H01M 50/557* | (2021.01) |
| *B64D 27/24* | (2006.01) |

(52) U.S. Cl.
CPC ....... *H01M 10/625* (2015.04); *H01M 10/647* (2015.04); *H01M 10/653* (2015.04); *H01M 10/658* (2015.04); *H01M 10/6555* (2015.04); *H01M 10/6557* (2015.04); *H01M 10/6567* (2015.04); *H01M 50/557* (2021.01); *B60L 2240/545* (2013.01); *B64D 27/24* (2013.01); *H01M 2220/20* (2013.01); *Y02T 10/70* (2013.01)

(56) References Cited

U.S. PATENT DOCUMENTS

| | | |
|---|---|---|
| 2009/0220681 A1 | 9/2009 | Brabec |
| 2011/0003197 A1 | 1/2011 | Kritzer et al. |
| 2011/0052959 A1* | 3/2011 | Koetting ........... H01M 10/6555 429/120 |
| 2012/0263984 A1 | 10/2012 | Krammer |
| 2013/0071720 A1 | 3/2013 | Zahn |
| 2013/0302127 A1 | 11/2013 | Kuji |
| 2014/0220410 A1 | 8/2014 | Maguire et al. |

FOREIGN PATENT DOCUMENTS

| | | |
|---|---|---|
| DE | 102009028920 A1 | 3/2011 |
| DE | 102010005097 A1 | 7/2011 |
| DE | 102010014915 A1 | 10/2011 |
| DE | 102010021922 A1 | 12/2011 |
| DE | 102010046933 A1 | 3/2012 |
| EP | 2284425 A1 | 2/2011 |
| EP | 2669917 A1 | 12/2013 |
| WO | WO2011035990 A1 | 3/2011 |
| WO | WO2011073424 A1 | 6/2011 |
| WO | WO2011073425 A1 | 6/2011 |
| WO | WO2011088997 A1 | 7/2011 |
| WO | WO2012136323 A2 | 10/2012 |

OTHER PUBLICATIONS

Oppostion filed by Fraunhofer Gesellschaft zur Förderung der angewandten Forschung e. V. on May 11, 2017 against DE Patent No. 10 2015 202 149.
Chinese Office Action for Chinese Application No. 201680008971.8 dated Jul. 30, 2019.
German Office Action for related German Application No. 10 2015 202 149.1 dated Dec. 4, 2015, with English Translation.
PCT International Search Report and Written Opinion of the International Searching Authority dated Apr. 4, 2016, for corresponding PCT/EP2016/050954.

* cited by examiner

ELECTRICAL ENERGY STORAGE DEVICE WITH EFFICIENT HEAT DISSIPATION

The present patent document is a §371 nationalization of PCT Application Serial Number PCT/EP2016/050954, filed Jan. 19, 2016, designating the United States, which is hereby incorporated by reference, and this patent document also claims the benefit of DE 10 2015 202 149.1, filed Feb. 6, 2015, which is also hereby incorporated by reference.

TECHNICAL FIELD

The present disclosure relates to an electrical energy storage device, wherein the energy storage device includes a number of prismatic electrical storage cells, and wherein the storage cells are arranged beside one another such that interfaces of adjacent storage cells run at a distance from one another, so that the interfaces of the adjacent storage cells form an intermediate space.

The present disclosure also relates to a vehicle, wherein the vehicle includes at least one electrical motion drive and an electrical energy storage device, and wherein the motion drive is supplied with electrical energy from the energy storage device.

BACKGROUND

Electrical energy storage devices are becoming increasingly important both for mobile applications as well as for stationary applications. Furthermore, attempts are being made to store ever greater quantities of energy in the energy storage devices and to obtain ever greater outputs from the energy storage devices. Extreme demands are made on the energy storage devices for many applications in the mobile area, e.g., in the case of aircraft. In order to provide a defect-free function, durability, and uniform aging of the storage cells, the thermal management of the storage cells, amongst other things, is of great importance.

The individual storage cells may have a cuboid shape. A plurality of such storage cells is arranged beside one another and are connected electrically to one another. The connection may be in series or in parallel as required.

Interlayers may be arranged in the intermediate spaces between adjacent storage cells. The interlayers perform some or all of the following functions: mechanical separation of the storage cells; dissipation to the exterior of the heat arising during the charging and discharging of the storage cells; thermal equilibrium of the storage cells both amongst one another and also inside the storage cells; and prevention of possible safety-critical reactions jumping from storage cell to storage cell.

Metal plates may be used for heat dissipation and thermal equilibrium. Isolating plates may be also installed for the isolation and prevention of jumping-over of safety-critical reactions.

In particular, the thermal tasks may be performed only insufficiently in the prior art. The reason for this is that the storage cells change their shape during the charging and discharging. In particular, the changes in shape are not uniform. An exactly cuboid storage cell in the uncharged state, for example, may have a slightly bulging shape in the charged state. Furthermore, in addition to such changes in shape arising cyclically during the charging and discharging of the storage cell, changes in shape also occur during the life of the storage cell.

SUMMARY AND DESCRIPTION

The problem of the present disclosure consists in creating possibilities by which, despite the changes in shape of the storage cells, an efficient dissipation of the heat arising in the storage cells may at all times be provided.

The scope of the present disclosure is defined solely by the appended claims and is not affected to any degree by the statements within this summary. The present embodiments may obviate one or more of the drawbacks or limitations in the related art.

The problem is solved by an electrical energy storage device.

The electrical energy storage device includes: (1) a first layer made of a compressible, flexible and heat-conducting material is arranged in each case between the interfaces of adjacent storage cells, the first layer abutting under pressure against one of the two interfaces of the adjacent storage cells; (2) either the respective first layer also abuts under pressure against the other of the two interfaces of the adjacent storage cells, or a second layer made of a compressible, flexible and heat-conducting material is arranged between the two interfaces of the adjacent storage cells, the second layer abutting under pressure against the other of the two interfaces of the adjacent storage cells, and (3) a heat-conducting device is arranged in the first layer or in the first layer and the second layer or between the first layer and the second layer, by which device thermal energy arising during charging and/or discharging of the storage cells is conducted out of the intermediate space between the adjacent storage cells.

In particular, the effect of this is that the first layer or the first and the second layer on the one hand are compressible and flexible and on the other hand abut under pressure against the interfaces of the storage cells, and irrespective of deformations of the storage cells that occur during operation of the storage cells a good thermal contact of the first layer or the first layer and the second layer with the storage cells is at all times maintained. The layers may thus absorb and transmit the heat arising. The conducting of the arising heat out of the intermediate space takes place by the heat-conducting device.

In one case, the heat-conducting device is constituted as a flexible, heat-conducting layer or as a metal plate, wherein the heat-conducting device, apart from the metal plate as such, does not include any further elements inside the intermediate space.

Alternatively, it is possible for the heat-conducting device to be constituted as a liquid cooling medium, which flows through cavities of the first layer and/or of the second layer.

A combination of a metal plate and a liquid cooling medium is also possible. In this case, the heat-conducting device includes a metal plate arranged between the first layer and the second layer, and additionally includes a liquid cooling medium, which flows through cavities of the metal plate.

If a liquid cooling medium is used, the liquid cooling medium may be an electrically non-conductive and non-combustible liquid, e.g., a fire-extinguishing agent. The liquid cooling medium may be water, oil, or a liquid with a boiling point between 30° C. and 50° C. De-ionized water may be regarded in this connection as electrically non-conductive or sufficiently poorly electrically conductive.

The first layer and/or the second layer may be made of a plastic or silicone.

If a first and a second layer are present and the heat-conducting device is implemented in the layers themselves, it is possible for a thermal insulating layer to be arranged between the first layer and the second layer. Furthermore, it is then also possible for a thermal insulating layer to be arranged between the first layer and the second layer if a heat-conducting layer, for example a (thinner or thicker) metal plate, is arranged in each case between the thermal insulating layer and the first layer and the second layer.

In a further embodiment, the first layer and/or the second layer surround a plurality of the storage cells in a meandering manner, so that the first layer abuts against two interfaces of one and the same storage cell and/or against the interfaces of two adjacent storage cells that bound one of the intermediate spaces and/or the second layer abuts against two interfaces of one and the same storage cell and/or against the interfaces of two adjacent storage cells that bound one of the intermediate spaces.

The problem is also solved by a vehicle having an electrical energy storage device as described herein.

BRIEF DESCRIPTION OF THE DRAWINGS

The properties, features, and advantages of the disclosure described above and the manner in which the latter are achieved will become clearer and more readily comprehensible in connection with the following description of the examples, which are explained in greater detail in connection with the drawings. In the figures, in diagrammatic representation.

DETAILED DESCRIPTION

Figure 1:
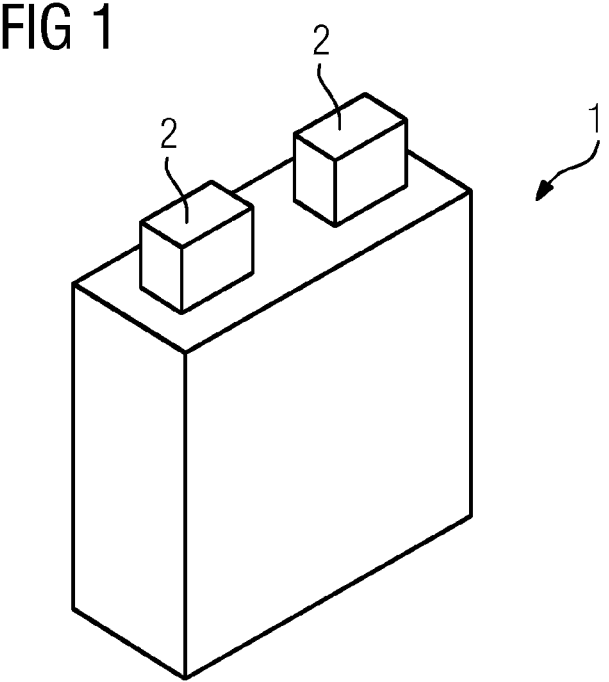
FIG. 1 depicts an example of a storage cell in a perspective view.

According to FIG. 1, a prismatic, an electrical storage cell 1 has a cuboid shape. The storage cell 1 includes connections 2 at one of its outer faces. The storage cell 1 may be charged or electrical energy may be removed from the storage cell 1 via the connections 2, depending on the direction of the current. The electrical storage cells may be constituted as battery cells, as double-layer capacitors, or as Li-capacitors. Other embodiments are also possible.

Figure 2:
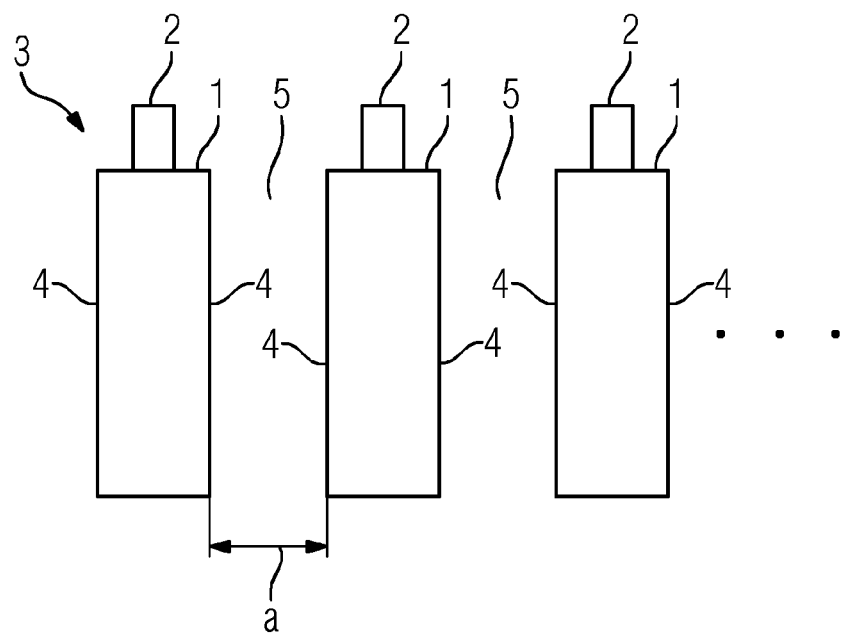
FIG. 2 depicts an example of a plurality of storage cells in a plan view.

According to FIG. 2, an electrical energy storage device 3 includes a plurality of such storage cells 1. According to FIG. 2, the storage cells 1 are arranged beside one another. Interfaces 4 of adjacent storage cells 1 run at a distance a from one another. Interfaces 4 of adjacent storage cells 1 thus form an intermediate space 5.

In connection with FIGS. 3 to 8, a pair of adjacent storage cells 1 has been singled out in each case and explained in greater detail below. The corresponding embodiments also apply however to other adjacent storage cells 1.

Figure 3:
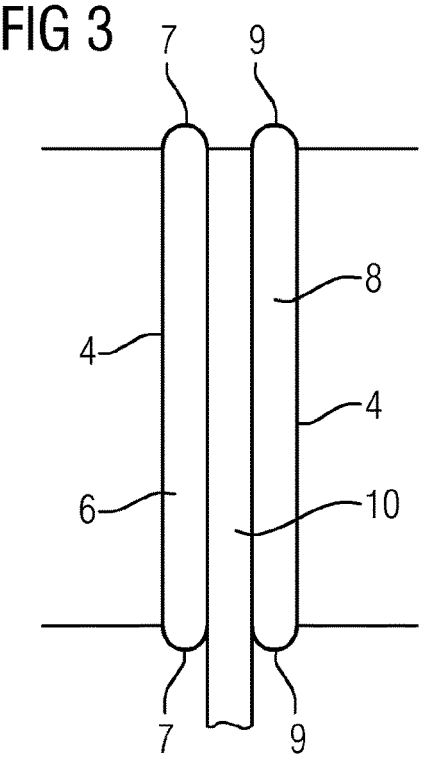
FIGS. 3 to 8 depict examples of interfaces of adjacent storage cells and the intermediate space between the interfaces.

According to FIG. 3, a first layer 6 is arranged between interfaces 4 of adjacent storage cells 1. The first layer 6 is made of a compressible, flexible, and heat-conducting material. The first layer 6 may be made of a plastic or silicone. The first layer 6 abuts under pressure against one of the two interfaces 4 of adjacent storage cells 1. The pressure may be seen in FIG. 3 by the fact that the first layer 6 includes bulges 7 in its outer regions.

According to FIG. 3, a second layer 8 is also arranged between interfaces 4 of adjacent storage cells 1. The second layer 8 is also made of a compressible, flexible, and heat-conducting material. The second layer 8 may be made of the same material as the first layer 6. The second layer 8 abuts under pressure against the other of the two interfaces 4 of adjacent storage cells 2. The pressure may be seen in FIG. 3 by the fact that second layer 8 includes bulges 9 in its outer regions.

In the embodiment according to FIG. 3, a metal plate 10 is arranged as a heat-conducting device between the first layer 6 and the second layer 8. By the metal plate 10, thermal energy arising during charging and/or discharging of the storage cells 1 is conducted out of the intermediate space 5 between adjacent storage cells 1 by thermal conduction inside the metal plate 10. Alternatively, a flexible heat-conducting layer may be present instead of metal plate 10.

Figure 4:
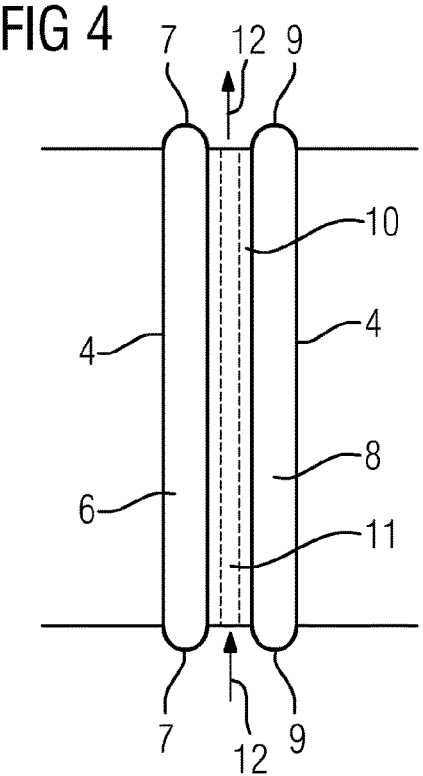

The embodiment from FIG. 4, to a large extent, corresponds to the embodiment from FIG. 3. Only the differences will therefore be dealt with in detail below.

The metal plate 10 is also present in the embodiment according to FIG. 4. In the embodiment according to FIG. 4, the metal plate 10 includes cavities 11. A liquid cooling medium 12 flows through the cavities 11 of the metal plate 10. In the embodiment according to FIG. 4, the thermal energy arising is thus first absorbed by the metal plate 10. The absorbed thermal energy is then conveyed to the cooling medium 12 and is conducted out of the intermediate space 5 by the cooling medium 12. In the embodiment according to FIG. 4, the heat-conducting device thus includes the liquid cooling medium 12 in addition to the metal plate 10.

The liquid cooling medium 12 may be an electrically non-conductive and non-combustible liquid. Alternatively, or in addition, the liquid cooling medium 12 may be water, (e.g., de-ionized water). As an alternative to water, the liquid cooling medium 12 may be an oil, (e.g., transformer oil). The liquid cooling medium 12 may also be a liquid with a boiling point between 30° C. and 50° C., (e.g., a liquid with a boiling point between 35° C. and 45° C.). The boiling point is related to normal air pressure.

Figure 5:
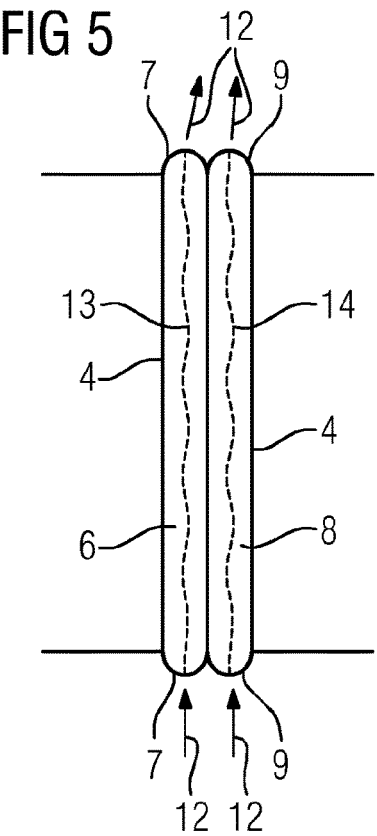

The embodiment from FIG. 5 also to a large extent corresponds to the embodiment from FIG. 3. Only the differences will therefore be dealt with in detail below.

No metal plate is present in the embodiment according to FIG. 5. Only the first layer 6 and the second layer 8 are present. The first and second layers 6, 8 have been produced in such a way that they include continuous cavities 13, 14. The production of such layers 6, 8 is known to the person skilled in the art. In the embodiment according to FIG. 5, the liquid cooling medium 12 flows directly through the cavities 13, 14 of the first layer 6 and the second layer 8. In this case, the heat-conducting device corresponds directly to the liquid cooling medium 12. Also in the embodiment according to FIG. 5, the arising thermal energy is thus absorbed directly by the cooling medium 12 and conducted out of the intermediate space 5 by the cooling medium 12. In the embodiment according to FIG. 5, the heat-conducting device exclusively includes the liquid cooling medium 12.

Figure 6:
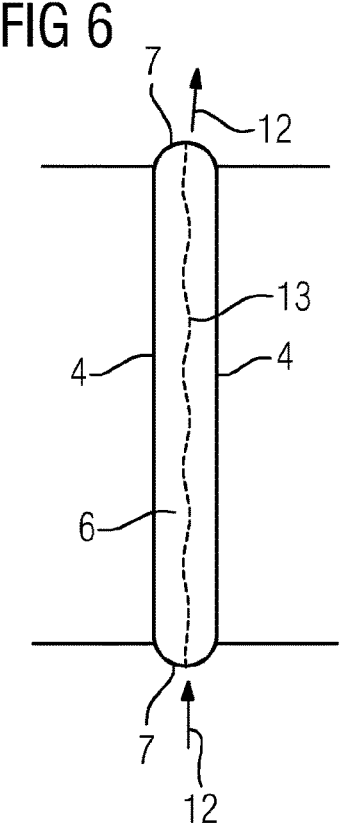

The embodiment from FIG. 6 to a large extent corresponds to the embodiment from FIG. 5. Only the differences will therefore be dealt with in detail below.

In the embodiment according to FIG. 6, neither the metal plate nor the second layer is present. Only the first layer 6 is present. In the embodiment according to FIG. 6, the first layer 6 abuts under pressure not only against one of the two interfaces 4 of adjacent storage cells 1, but also abuts against the other of the two interfaces 4 of the adjacent storage cells 1. Cavities 13 of the first layer 6 continue to be present and the liquid cooling medium 12 flows through the latter.

Figure 7:
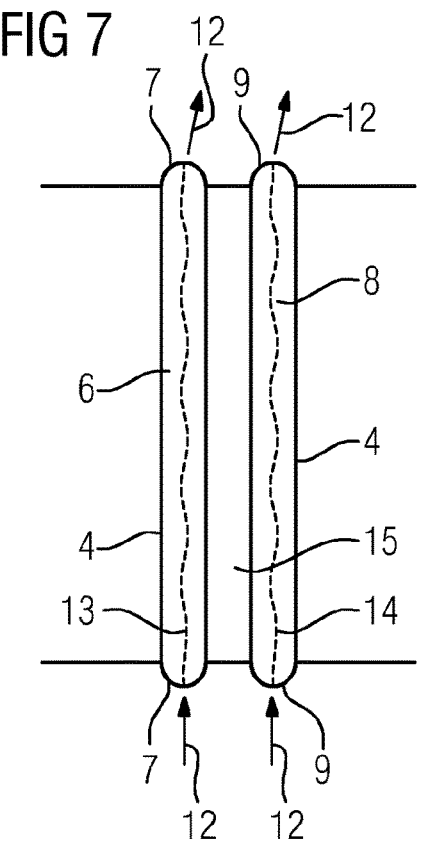

The embodiment from FIG. 7, to a large extent, corresponds to the embodiment from FIG. 5. Only the differences will therefore be dealt with in detail below.

In the embodiment according to FIG. 7, a thermal insulating layer 15 is present in addition to the first layer 6 and the second layer 8. The thermal insulating layer 15 may be made of cork or a fire-retardant plastic. The effect of the presence of the thermal insulating layer 15 is that, in the event of a malfunction of one of the storage cells 1, the malfunction remains restricted to the given storage cell 1, e.g., the malfunction does not jump over to an adjacent storage cell 1.

Figure 8:
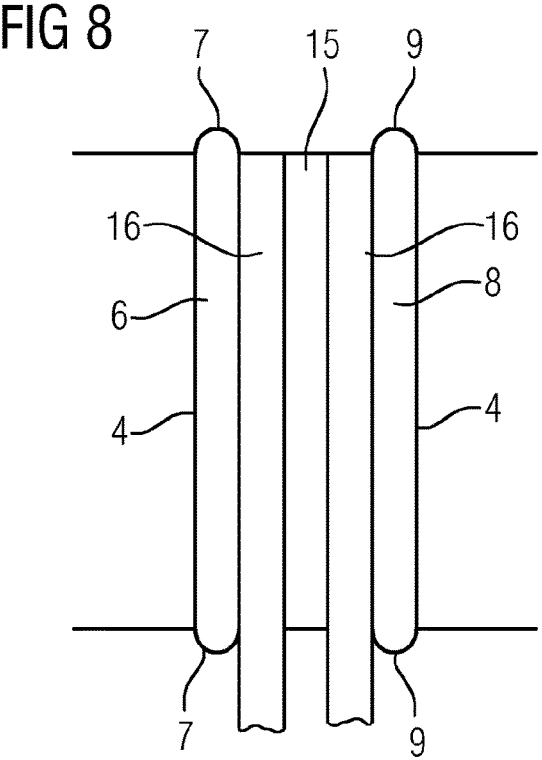

The embodiment from FIG. 8 proceeds from the embodiment from FIG. 7. Only the differences will therefore be dealt with in detail below.

In the embodiment according to FIG. 8, a heat-conducting layer 16 is arranged between the thermal insulating layer 15 and respectively the first layer 6 and the second layer 8. Heat-conducting layers 16, similar to the embodiment from FIGS. 3 and 4, may be constituted as metal plates with or without cavities through which a liquid cooling medium flows. In the case of the embodiment from FIG. 8, it is possible for cavities 13, 14 to be absent in the first layer 6 and the second layer 8. Alternatively, it is possible for cavities 13, 14 to be present.

Figure 9:
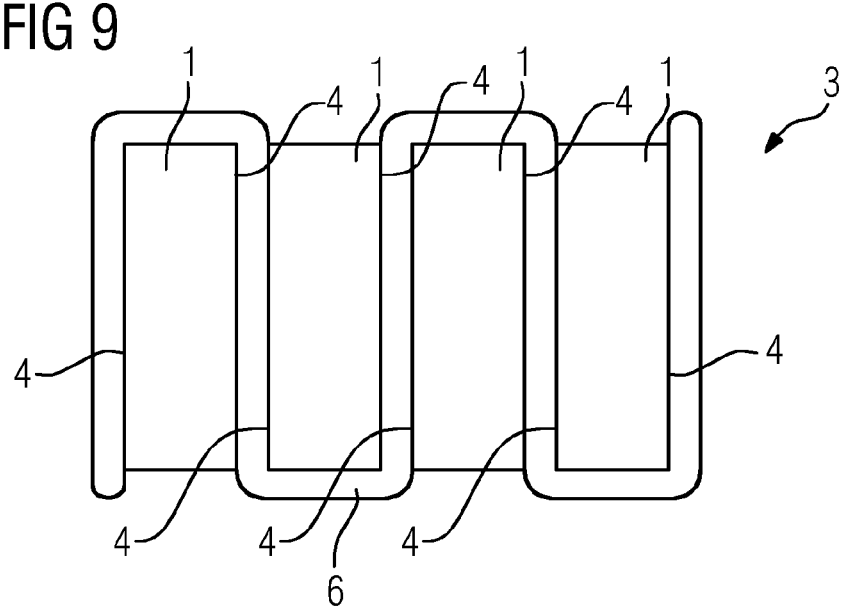
FIGS. 9 to 11 depict examples of a plurality of storage cells in a plan view.
Figure 10:
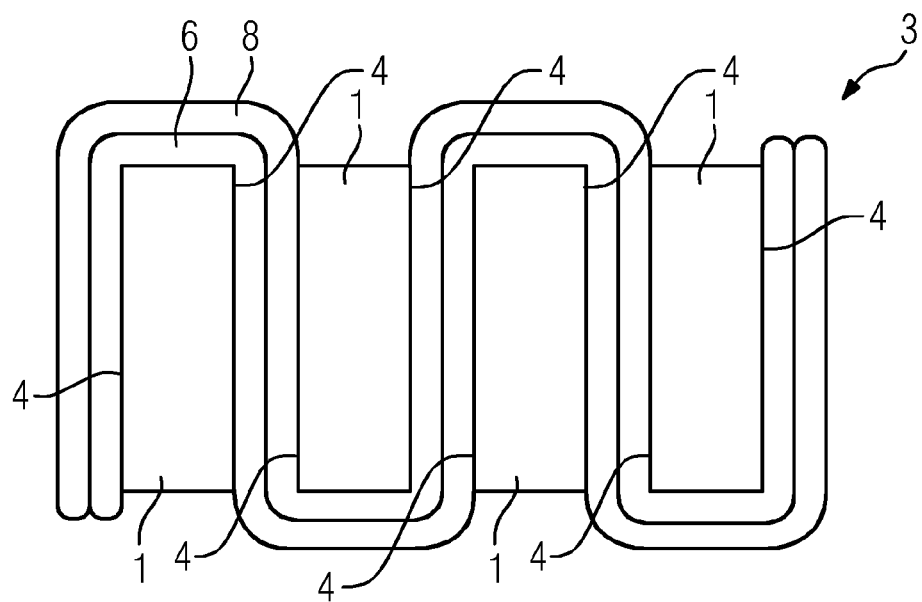
Figure 11:
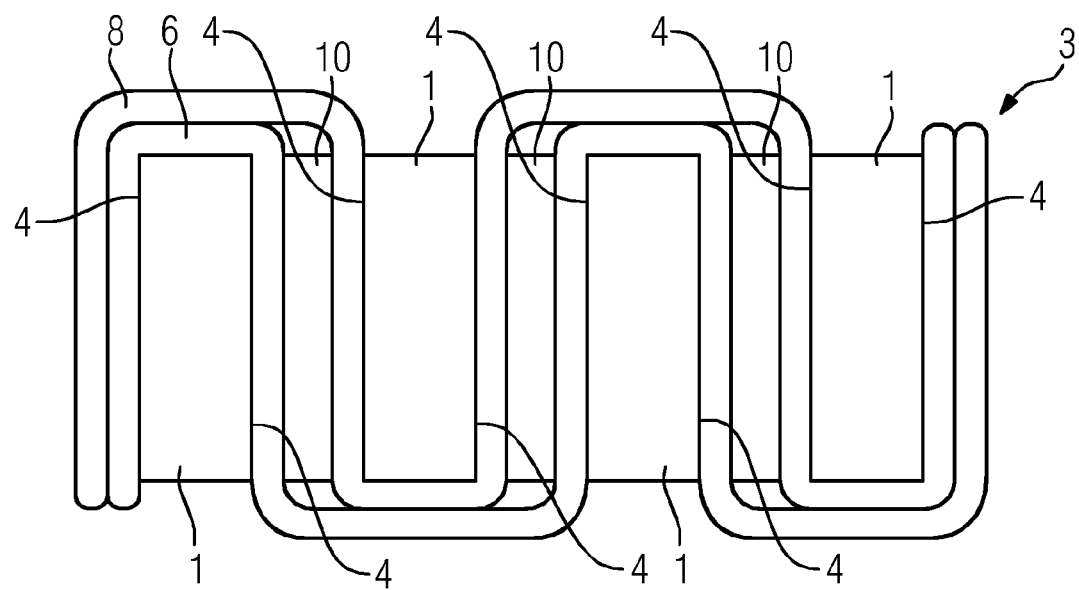

It is possible for the first layer 6 and optionally also the second layer 8 to be arranged in each case only in a single intermediate space 5. Alternatively, it is possible for the first layer 6 and/or the second layer 8 to surround a plurality of storage cells 1 in a meandering manner, so that the first layer 6 abuts against two interfaces 4 of one and the same storage cell 1 and/or the second layer 8 abuts against two interfaces 4 of one and the same storage cell 1. FIG. 9 depicts a corresponding embodiment, wherein only the first layer 6 is present. FIG. 10 depicts a corresponding embodiment, wherein the second layer 8 is also present in addition to first layer 6. FIG. 11 depicts a corresponding embodiment, wherein metal plates 10 are also present in addition to the first layer 6 and the second layer 8. In the context of the embodiment according to FIG. 11, metal plates 10 may alternatively include cavities 11 or not. The conducting of the thermal energy out of the intermediate space 5 takes place in the embodiment according to FIG. 11 orthogonal to the drawing plane, e.g., towards the observer of FIG. 11 or away from the observer. Furthermore, it is possible for the meandering structure of the first layer 6 and the second layer 8 also to be implemented in connection with the embodiments of FIGS. 7 and 8. Flexible heat-conducting layers may again also be present here instead of metal plates 10. Furthermore, it is possible for layers 6, 8, (e.g., as an alternative or in addition to the abutting against two interfaces 4 of one and the same storage cell 1), to abut against interfaces 4 of two storage cells 1 which bound a specific one of the intermediate spaces 5.

Figure 12:
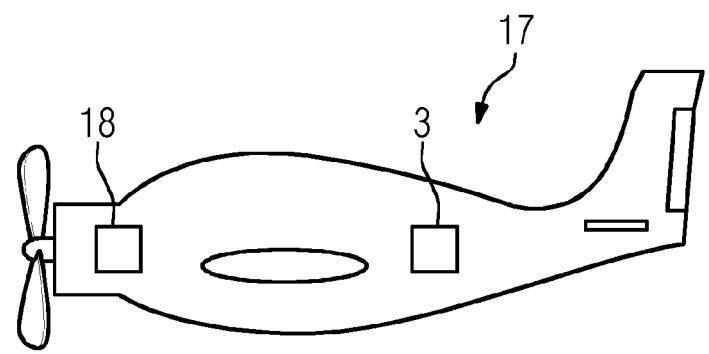
FIG. 12 depicts an example of a vehicle.

According to FIG. 12, the energy storage device 3 may be a component of a vehicle 17, (e.g., an aircraft). The vehicle 17 also includes an electrical motion drive 18, e.g., a drive that brings about the movement of the vehicle 17 as a whole. In the case of a road or rail vehicle, the motion drive 18 is a traveling drive. According to FIG. 12, the motion drive 18 is supplied with electrical energy from the energy storage device 3.

To sum up, the present disclosure thus relates to the following facts:

An electrical energy storage device 3 includes a number of prismatic electrical storage cells 1. Storage cells 1 are arranged beside one another, such that interfaces 4 of adjacent storage cells 1 run at a distance a from one another, so that interfaces 4 of adjacent storage cells 1 form an intermediate space 5. A first layer 6 made of a compressible, flexible, and heat-conducting material is arranged in each case between interfaces 4 of adjacent storage cells 1, the first layer abutting under pressure against one of the two interfaces 4 of adjacent storage cells 1. Either respective first layer 6 abuts under pressure against the other of the two interfaces 4 of adjacent storage cells 1 or a second layer 8 made of a compressible, flexible, and heat-conducting material is arranged between the two interfaces 4 of adjacent storage cells 1, the second layer abutting under pressure against the other of the two interfaces 4 of adjacent storage cells 1. A heat-conducting device 10, 12, 10+12 is arranged in first layer 6 or in the first layer 6 and the second layer 8 or between the first layer 6 and the second layer 8, by which heat-conducting device thermal energy arising during the charging and/or discharging of storage cells 1 is conducted out of the intermediate space 5 between adjacent storage cells 1.

The present disclosure has many advantages. In particular, a thickness compensation may take place in a straightforward and reliable manner throughout the entire life of storage cells 1 by the first layer 6, (optionally in cooperation with the second layer 8), so that a two-dimensionally extending contact of the layers 6, 8 with interfaces 4 is present at all times. An efficient dissipation of the arising heat may thus be provided.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. An electrical energy storage device comprising:
   prismatic electrical storage cells arranged beside one another such that interfaces of adjacent storage cells run at a distance from one another, wherein the interfaces of the adjacent storage cells form an intermediate space;
   a first layer having a compressible, flexible, and heat-conducting material, wherein the first layer is arranged between the interfaces of the adjacent storage cells, wherein a first surface of the first layer abuts under pressure against one interface of the two interfaces of the adjacent storage cells; and
   a second layer having a compressible, flexible, and heat-conducting material, wherein the second layer is arranged between the two interfaces of the adjacent storage cells, wherein a first surface of the second layer abuts a second surface of the first layer, and wherein a second surface of the second layer abuts under pressure against the other interface of the two interfaces of the adjacent storage cells, wherein a heat-conducting device is embedded within each of the compressible, flexible, and heat-conducting material of the first layer and the compressible, flexible, and heat-conducting material of the second layer, and wherein thermal energy arising during charging and/or discharging of the storage cells is conducted out of the intermediate space between the adjacent storage cells.

2. The energy storage device of claim 1, wherein the heat-conducting device comprises a liquid cooling medium.

3. The energy storage device of claim 2, wherein the liquid cooling medium is an electrically non-conductive and non-combustible liquid.

4. The energy storage device of claim 3, wherein the electrically non-conductive and non-combustible liquid is a fire-extinguishing agent.

5. The energy storage device of claim 3, wherein the liquid cooling medium is water, oil, or a liquid with a boiling point between 30° C. and 50° C.

6. The energy storage device of claim 2, wherein the liquid cooling medium is water, oil, or a liquid with a boiling point between 30° C. and 50° C.

7. The energy storage device of claim 1, wherein the first layer, the second layer, or both the first layer and the second layer are made of a plastic or silicone.

8. The energy storage device of claim 1, further comprising:
a thermal insulating layer arranged between the first layer and the second layer.

9. The energy storage device of claim 1, wherein the first layer surrounds a plurality of the storage cells in a meandering manner, such that the first layer: abuts against two interfaces of one and the same storage cell, abuts against the interfaces of two adjacent storage cells that bound one of the intermediate spaces, or abuts against the two interfaces of one and the same storage cell and abuts against the interfaces of the two adjacent storage cells that bound one of the intermediate spaces.

10. The energy storage device of claim 9, wherein the second layer also surrounds the plurality of the storage cells in a meandering manner, such that the second layer: abuts against two interfaces of one and the same storage cell, abuts against the interfaces of two adjacent storage cells that bound one of the intermediate spaces, or abuts against the two interfaces of one and the same storage cell and abuts against the interfaces of the two adjacent storage cells that bound one of the intermediate spaces.

11. The energy storage device of claim 1, wherein the second layer surrounds a plurality of the storage cells in a meandering manner, such that the second layer: abuts against two interfaces of one and the same storage cell, abuts against the interfaces of two adjacent storage cells that bound one of the intermediate spaces, or abuts against the two interfaces of one and the same storage cell and abuts against the interfaces of the two adjacent storage cells that bound one of the intermediate spaces.

12. A vehicle comprising:
an electrical energy storage device comprising:
prismatic electrical storage cells arranged beside one another such that interfaces of adjacent storage cells run at a distance from one another, wherein the interfaces of the adjacent storage cells form an intermediate space;

a first layer having a compressible, flexible, and heat-conducting material, wherein the first layer is arranged between the interfaces of the adjacent storage cells, wherein a first surface of the first layer abuts under pressure against one interface of the two interfaces of the adjacent storage cells; and a second layer having a compressible, flexible, and heat-conducting material, wherein the second layer is arranged between the two interfaces of the adjacent storage cells, wherein a first surface of the second layer abuts a second surface of the first layer, and wherein a second surface of the second layer abuts under pressure against the other interface of the two interfaces of the adjacent storage cells, wherein a heat-conducting device is embedded within each of the compressible, flexible, and heat-conducting material of the first layer and the compressible, flexible, and heat-conducting material of the second layer, and wherein thermal energy arising during charging and/or discharging of the storage cells is conducted out of the intermediate space between the adjacent storage cells; and at least one electrical motion drive,
wherein the electrical motion drive is supplied with electrical energy from the energy storage device.

13. The energy device of claim 9, wherein the first layer comprises a plastic or silicone.

14. The energy device of claim 10, wherein both the first layer and the second layer comprises a plastic or silicone.

15. The energy device of claim 11, wherein the second layer comprises a plastic or silicone.

16. An electrical energy storage device comprising:
prismatic electrical storage cells arranged beside one another such that interfaces of adjacent storage cells run at a distance from one another, wherein the interfaces of the adjacent storage cells form an intermediate space; and a single intermediate layer having a compressible, flexible, and heat-conducting material, wherein the intermediate layer is arranged between the interfaces of the adjacent storage cells, wherein a first surface of the intermediate layer abuts under pressure against one interface of the two interfaces of the adjacent storage cells and wherein a second, opposite surface of the intermediate layer abuts under pressure against the other interface of the two interfaces of the adjacent storage cells, wherein a heat-conducting device is embedded within the compressible, flexible, and heat-conducting material of the intermediate layer, and wherein thermal energy arising during charging and/or discharging of the storage cells is conducted out of the intermediate space between the adjacent storage cells.

17. The energy storage device of claim 1, wherein the heat-conducting device in each layer of the first layer and the second layer comprises cavities.

18. The energy storage device of claim 17, wherein a liquid cooling medium is configured to flow through the cavities of the heat-conducting device in each layer of the first layer and the second layer.

* * * * *